United States Patent
Ye et al.

(10) Patent No.: US 11,632,182 B2
(45) Date of Patent: Apr. 18, 2023

(54) REAL-TIME DETECTION OF INTERFERING DEVICE

(71) Applicant: Nokia Solutions and Networks Oy, Espoo (FI)

(72) Inventors: Chenhui Ye, Shanghai (CN); Xiaofeng Hu, Shanghai (CN); Kaibin Zhang, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 44 days.

(21) Appl. No.: 17/151,874

(22) Filed: Jan. 19, 2021

(65) Prior Publication Data

US 2021/0226714 A1    Jul. 22, 2021

(30) Foreign Application Priority Data

Jan. 20, 2020    (CN) .......................... 202010066146.1

(51) Int. Cl.
*H04B 17/345*    (2015.01)
*H04B 17/27*    (2015.01)
*H04K 3/00*    (2006.01)

(52) U.S. Cl.
CPC .......... *H04B 17/345* (2015.01); *H04B 17/27* (2015.01); *H04K 3/22* (2013.01)

(58) Field of Classification Search
CPC ......... G01J 3/0218; G02B 2006/12159; H04B 10/70; H04B 17/345; H04B 17/27;
(Continued)

(56) References Cited

U.S. PATENT DOCUMENTS

2013/0156423 A1*    6/2013    Zhang ................ H04Q 11/0067
398/35
2015/0319768 A1*    11/2015    Abdelmonem ...... H04J 11/0066
455/501
(Continued)

FOREIGN PATENT DOCUMENTS

| CN | 104221307 A | 12/2014 | |
| CN | 107105354 A | 8/2017 | |
| WO | WO-2020083319 A1 * | 4/2020 | ......... H04B 10/0791 |

OTHER PUBLICATIONS

Wiklundh, "Relation Between the Amplitude Probability Distribution of an Interfering Signal and its Impacton Digital Radio Receivers", 2006, IEEE Xplore, 8 pages (Year: 2006).*

(Continued)

*Primary Examiner* — Quoc Thai N Vu
(74) *Attorney, Agent, or Firm* — Harness, Dickey & Pierce, P.L.C.

(57) ABSTRACT

In the method, a first device receives a mixed signal including a target signal from a target device among a plurality of second devices and an interfering signal from the plurality of second devices. The first device determines a distribution characteristic of an amplitude of the mixed signal within an amplitude variation range, the distribution characteristic being associated with the target device and an interfering device generating the interfering signal. The first device determines the interfering device from the plurality of second devices based on the distribution characteristic. An interfering device in a communication system may be detected in real-time and accurately.

18 Claims, 8 Drawing Sheets

(58) Field of Classification Search
CPC .... H04B 10/075; H04B 10/80; H04B 1/1036; H04B 1/71; H04B 1/7103; H04B 15/00; H04Q 2011/0083; H04Q 2011/0079; H04Q 11/0067; H04K 3/22; H04J 11/005; H04J 11/0066; H04W 52/243; H04W 72/082

See application file for complete search history.

(56) References Cited

U.S. PATENT DOCUMENTS

| | | | |
|---|---|---|---|
| 2017/0005722 A1* | 1/2017 | Huang | H04B 10/0795 |
| 2017/0373758 A1* | 12/2017 | Han | H04B 15/00 |
| 2019/0097724 A1 | 3/2019 | Ye et al. | |

OTHER PUBLICATIONS

Horvath et al., "GPON network with Simulated Rogue ONU", 2019, IEEEXplore, 5 pages, (Year: 2019).*
Dehkordi et al., "Interference Analysis for Optical Wireless Interconnections", IEEE, 2018, 7 pages. (Year: 2018).*
First Office Action issued Sep. 26, 2022 in Chinese Application No. 202010066146.1.
Shan Liang et al., "Deception Jamming Identification Methods Based on Goodness of fit" Journal of Detection & Control, vol. 38, No. 2 Apr. 2016.

* cited by examiner

REAL-TIME DETECTION OF INTERFERING DEVICE

CROSS-REFERENCE TO RELATED APPLICATIONS

The present application claims priority under 35 U.S.C. § 119 to Chinese Patent Application No. 202010066146.1, filed on Jan. 20, 2020, in the Chinese Intellectual Property Office, the entire contents of which are hereby incorporated by reference.

FIELD

Embodiments of the present disclosure generally relate to the technical field of communications, and more particularly relate to a technical solution for detecting an interfering device.

BACKGROUND

Due to many practical reasons, like external factors or device quality issues, the burst function of an optical module in an Optical Network Unit (ONU) may misbehave or fail in a communication system (e.g., a Passive Optical Network (PON)). Generally speaking, the optical network unit might have the following three categories of misbehaviors. The first misbehavior is laser abnormal-emission like leakage ahead of allowable timeslots or longtail emission afterwards. The second misbehavior is vicious emissions (also called as "rogue") at un-authorized timeslots. The third misbehavior is long-shining rogue emissions caused by shutdown failure or disability.

The common point of these emission misbehaviors is that they all send signals at wrong timeslots that an Optical Line Terminal (OLT) cannot determine (so called "timeslot error rogue-ONU" throughout the present disclosure). Therefore, quick detection or recognition of the rogue-ONU would be advantageous in order to enable OLT to shut down the misbehaving ONU correctly and restore the PON back to normal operation.

SUMMARY

Embodiments of the present disclosure relate to a technical solution of detecting an interfering device.

In a first aspect of the present disclosure, there is provided a method for communications. The method comprises: receiving, at a first device, a mixed signal comprising a target signal from a target device among a plurality of second devices and an interfering signal from the plurality of second devices. The method further comprises: determining a distribution characteristic of an amplitude of the mixed signal within an amplitude variation range, the distribution characteristic being associated with the target device and an interfering device generating the interfering signal. The method further comprises: determining the interfering device from the plurality of second devices based on the distribution characteristic.

In a second aspect, there is provided a device. The device comprises at least one processor and at least one memory comprising computer program instructions. The at least one memory and the computer program instructions are configured to, with the at least one processor, cause a first device to: receive a mixed signal comprising a target signal from a target device among a plurality of second devices and an interfering signal from the plurality of second devices. The at least one memory and the computer program instructions are further configured to, with the at least one processor, cause the first device to: determine a distribution characteristic of an amplitude of the mixed signal within an amplitude variation range, the distribution characteristic being associated with the target device and an interfering device generating the interfering signal. The at least one memory and the computer program instructions are configured to, with the at least one processor, cause the first device to: determine the interfering device from the plurality of second devices based on the distribution characteristic.

In a third aspect of the present disclosure, there is provided an apparatus for communications. The apparatus comprises: means for receiving, at a first device, a mixed signal comprising a target signal from a target device among a plurality of second devices and an interfering signal from the plurality of second devices. The apparatus further comprises: means for determining a distribution characteristic of an amplitude of the mixed signal within an amplitude variation range, the distribution characteristic being associated with the target device and an interfering device generating the interfering signal. The apparatus further comprises: means for determining the interfering device from the plurality of second devices based on the distribution characteristic.

In a fourth aspect of the present disclosure, there is provided a computer readable medium. The computer readable medium has computer executable instructions stored thereon which, when executed, cause a machine to perform the method according to the first aspect.

It is to be understood that the summary section is not intended to define key or essential features of embodiments of the present disclosure, nor is it intended to be used to limit the scope of the present disclosure. Other features of the present disclosure would become easily comprehensible through the following description.

BRIEF DESCRIPTION OF THE DRAWINGS

Through the following detailed description with reference to the accompanying drawings, the above and other objects, features and advantages of embodiments of the present disclosure would become more apparent. In the drawings, several embodiments of the present disclosure are illustrated in an exemplary yet non-limiting manner.

Throughout the drawings, the same or similar reference numerals represent the same or similar components.

DETAILED DESCRIPTION OF EMBODIMENTS

Figure 1:
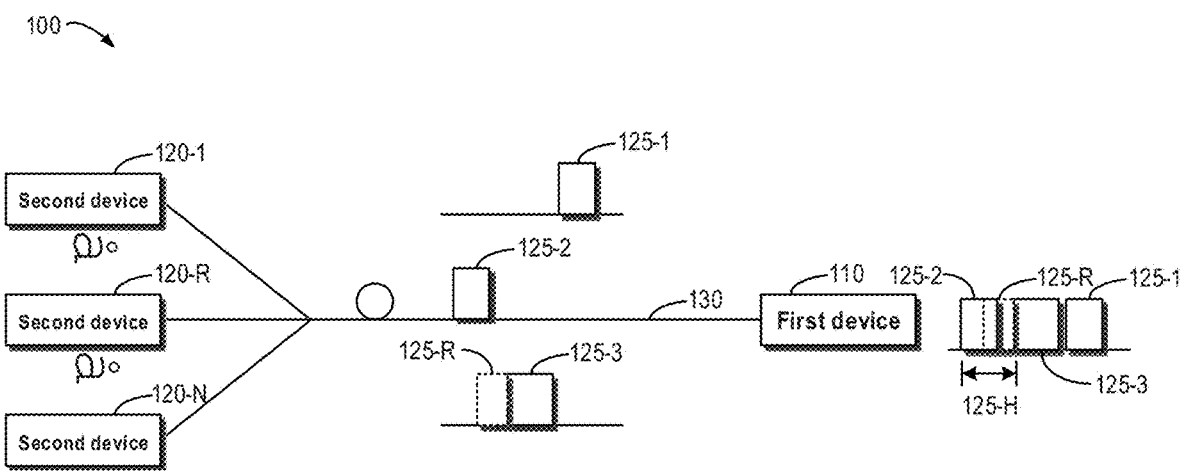
FIG. 1 illustrates a schematic diagram of a communication system in which embodiments of the present disclosure may be implemented.

The principle and spirit of the present disclosure will now be described with reference to several example embodiments shown in the figures. It is to be understood that these specific embodiments are described only for the purpose of illustration and to help those skilled in the art to understand and implement the present disclosure, without suggesting any limitation as to the scope of the present disclosure.

As used herein, the term "includes" and its variants are to be read as open-ended terms that mean "includes, but is not limited to." The term "based on" is to be read as "based at least in part on." The term "one embodiment" or "this embodiment" is to be read as "at least one embodiment." The terms "first," "second," and the like may refer to different or same objects. Other definitions, explicit and implicit, may be included below.

As used in the text herein, the term "determine" covers various actions. For example, "determine" may include operate, calculate, process, derive, investigate, look up (e.g., look up in a table, a database or another data structure), find out etc. In addition, "determine" may include receive (e.g., receive information"), access (e.g., access data in a memory), etc. in addition, "determine" may include parse, select, choose, establish etc.

As used in the text herein, the term "circuit" may refer to one or more or all of the following: (a) hardware-only circuit implementations (such as implementations in only analog and/or digital circuit); and (b) combinations of hardware circuits and software, such as (as applicable): (i) a combination of analog and/or digital hardware circuit(s) with software/firmware; and (ii) any portions of hardware processor(s) with software (including digital signal processor (s)), software, and memory(ies) that work together to cause an apparatus, such as an optical line terminal or other computing devices, to perform various functions); and (c) hardware circuit(s) and or processor(s), such as a microprocessor(s) or a portion of a microprocessor(s), that require software (e.g., firmware) for operation, but the software may not be present when it is not needed for operation.

This definition of circuit applies to all uses of this term in the present disclosure, including in any claims. As a further example, as used in the present application, the term circuit also covers an implementation of merely a hardware circuit or processor (or multiple processors) or portion of a hardware circuit or processor and its (or their) accompanying software and/or firmware. The term circuit also covers, for example and if applicable to the particular claim element, a baseband integrated circuit or processor integrated circuit or a similar integrated circuit in an optical line terminal or other computing device.

As mentioned above, to enable the optical line terminal to correctly shut down the misbehaving optical network unit and restore the passive optical network to normal operation, it is very important to quickly detect or recognize a rogue optical network unit. More generally, in order to improve the performance of the communication system, it would also be advantageous to detect interfering devices in the communication system in real-time and accurately.

Recently, in the standard conference on passive optical networks, in the document entitled "A method to improve the efficiency of rogue ONU detection", a continuous-mode rogue ONU detection method has already been proposed with special signaling design in MAC. However, the detection method has narrow applications, and is only adapted for continuous-mode rogue signal transmission. In addition, such type of solution has low efficiency because it is very conventional with the absence of advanced devices such as Analog-Digital Converter (ADC) and Physical Medium Dependent-Digital Signal Processor (PMD-DSP) in OLT and the like.

In fact, most conventional "rogue-ONU detection" approaches were originally designed for previous generation PONs like XG(S)-PON with the absence of ADC and DSP. Typically, conventional detection approaches may be classified into the following sorts. The first sort of detection approach is remotely controlling (to ask) each ONU to perform certain ONU-laser related actions, like restarting the lasers one by one in a traversal manner, for OLT to inspect whether it is out of control. This sort of detection approach requires interruption of normal communication and is indeed time-consuming.

The second sort of conventional approach is manually analyzing emitting laser characteristics of a plurality of (e.g., 64) ONUs (assuming the 64 wavelengths are distinguishable in the burst mode) using extra devices like spectra analyzer, or Optical Time-Domain Reflectometer (OTDR). This sort of laser-characteristic based approach may be hard to implement in practice considering similarity of all the lasers would drift during the burst mode. The third sort of conventional method is stuffing special bits into MAC signaling. This sort of approach is popular in standard proposals for its easy 'detection-if-used' but the method still has major flaws for it occupies certain bits in all MAC frames for the whole time for the rare rogue-behavior, and therefore reduces the transmission efficiency.

In view of the above-mentioned problems and other potential problems in the conventional solutions, the embodiments of the present disclosure provide a technical solution for detecting an interfering device. In the embodiments of the present disclosure, amplitude distribution characteristics of a mixed signal including a target signal and an interfering signal are used to recognize the interfering device sending out the interfering signal, thereby solving the above-mentioned problems in the conventional technical solution. In particular, compared to the conventional solutions, the embodiments of the present disclosure may detect the interfering device in the communication system in real-time and accurately without stopping or interrupting the normal operation of the communication system.

In addition, it should be appreciated that for a high-speed passive optical network (i.e., a passive optical network above 50 Gb/s), the optical line terminal includes an analog-to-digital converter and a physical medium dependent layer digital signal processor, so it is more beneficial to adopt the method of the embodiments of the present disclosure to effectively and accurately detect a rogue optical network unit.

Specifically, in the future high-speed passive optical network, due to the need of equalizing or compensating signal impairments, ADC/DSP has become mandatory (at least in OLT) in the design of physical medium dependent layers. Therefore, some embodiments of the present disclosure may use the output of the analog-digital converter of the optical line terminal, and use available DSP resources for extraction of signals sent out by the ONU, and rogue-ONU recognition, thereby making rogue-ONU detection easy and in real-time. Hereinafter, several embodiments of the present disclosure would be described in detail with reference to the figures.

FIG. 1 illustrates a schematic diagram of a communication system 100 in which embodiments of the present disclosure may be implemented. As shown in FIG. 1, the communication system 100 includes a first device 110 and a plurality of second devices 120-1 to 120-N, where N represents a natural number. The second devices 120-1 to 120-N may be respectively connected to the first device 110 via respective channel segments and a common communication channel 130. Without loss of generality, the description herein may use an individual second device (for example, the second device 120-1, etc.) as an example of the second device. Therefore, it should be understood that the description for the second device 120-1 would be equally applicable to other second devices among the second devices 120-1 to 120-N.

In the communication between the first device 110 and the second device 120-1, the first device 110 may send information or data to the second device 120-1 via the communication channel 130 and a channel segment specific to the second device 120-1, and may receive information or data from the second device 120-1. In addition, the first device 110 may also send a control signal or control instruction to the second device 120-1 via the communication channel 130 and the channel segment specific to the second device 120-1, or receive the control signal or control instruction from the second device 120-1. More generally, any data or information may be sent or received between the first device 110 and the second device 120-1 via the communication channel 130 and the channel segment specific to the second device 120-1.

In some embodiments, the communication system 100 may be a communication system based on a passive optical network, for example, Gigabit Passive Optical Network (G-PON), 10 Gigabit Passive Optical Network (XG-PON), 10 Gigabit Symmetrical Passive Optical Network (XGS-PON), 50 Gigabit Passive Optical Network (50G-PON), etc. In such cases, the first device 110 may be a terminal or a device at the service provider of the passive optical network, for example, an optical line terminal (OLT) and the like. The second devices 120-1 to 120-N may be terminals or devices at user locations of the passive optical network, for example, optical network units (ONUs) and the like. The communication channel 130 may include a transmission medium used in the passive optimal network including an optical fiber, an optical splitter, etc.

In other embodiments, the communication system 100 may also be any wired or wireless communication systems capable of implementing the embodiments of the present disclosure. In such cases, the first device 110 and the second devices 120-1 to 120-N may be any suitable wired or wireless communication devices, including but not limited to mainframes or large servers, cloud computing devices, mobile phones, stations, units, general-purpose computing devices, multimedia computers, multimedia tablets, Internet nodes, communicators, desktop computers, laptop computers, notebook computers, netbook computers, tablet computers, Personal Communication System (PCS) devices, personal navigation devices, Personal Digital Assistants (PDA), audio/video players, digital cameras/camcorders, positioning devices, TV receivers, radio broadcast receivers, e-book devices, gaming devices or any combinations thereof, including accessories and peripherals of these devices or any combinations thereof.

In such an embodiment, the communication channel 130 may be any form of connection or coupling capable of realizing data communication or control signal communication between various devices or components of the communication system 100, including but not limited to, coaxial cable, fiber optic cable, twisted pair, or wireless technology (such as infrared, radio, and microwave). In some embodiments, the communication channel 130 may also include, but is not limited to a device for network connection such as network card, hub, modem, repeater, bridge, switch and router, as well as various network connection lines, wireless links, etc. In some embodiments, the communication channel 130 may include various types of buses. In other embodiments, the communication channel 130 may include a computer network, a communication network, or other wired or wireless networks.

In the example scenario of FIG. 1, it is assumed that the second device 120-1 sends a signal 125-1 to the first device 110 on the communication channel 130 during a certain time period, and the second device 120-2 (not shown)) sends a signal 125-2 to the first device 110 on the communication channel 130 during another time period. In addition, between those two time periods, the second device 120-R sends a signal 125-3 to the first device 110 on the communication channel 130. However, as shown in FIG. 1, due to the abnormal signal emission behavior of the second device 120-R, the signal 125-3 sent out by it has a longtail effect (i.e., it fails to stop the signal emission in time), thereby generating an interfering signal 125-R overlapping the signal 125-2 of the second device 120-2 in the time domain.

At the first device 110, if there is no interfering signal 125-R, the first device 110 would receive signal 125-1, signal 125-3 and signal 125-2 sequentially from the second device 120-1, the second device 120-R and the second device 120-2. However, when the signal 125-2 and interfering signal 125-R overlapping in time domain reach the first device 110 at the same time, they would collide or be mixed, resulting in a mixed signal 125-H, which may cause the first device 110 to fail to recognize or detect the information to be transmitted in the signal 125-2 sent out by the second device 120-2, such as bit string information.

As mentioned above, in the conventional solution, the first device that receives this mixed signal would not know which second device sent the interfering signal out, thereby causing the signal conflict, and therefore cannot take a targeted measure or means, for example, cannot determine which second device should be shut off to restore the communication system. Therefore, the conventional solution needs to interrupt the normal operation of the whole communication system to detect the interfering device.

In contrast, in the embodiment of the present disclosure, the first device 110 may recognize which specific second device is the interfering device 120 according to the amplitude distribution characteristic of the mixed signal 125-H composed of the signal 125-2 and the interfering signal 125-R, without interrupting the normal operation of the communication system 100. Furthermore, the first device 110 may purposefully take a further measure to restore the operation of the communication system 100. For example, the first device 110 may notify the recognized second device 120-R with abnormal behavior to shut down, and reconnect to the communication system 100 after its function returns to normal.

It should be understood that the longtail emission described above is only an example of a case where the interfering device 120-R causes interference and is not intended to limit the scope of the present disclosure in any manner. In other embodiments, the second device 120-R might also send out the interfering signal 125-R for other reasons, for example, send the signal outside of a signal-sending timeslot allocated to it, and so on. In short, the second device 120-R, as the interfering device, sends out the interfering signal 125-R when it should not send a signal, causing the first device 110 to fail to properly receive an intended signal (also referred to as a target signal or a useful signal), e.g., signal 125-2 sent out by other second device (e.g., second device 120-2).

It should be appreciated that FIG. 1 only schematically shows devices, units, modules, or components in the communication system 100 related to the embodiments of the present disclosure. In practice, the communication system 100 may further include other devices, units, modules or components for other functions. In addition, the specific number of devices, units, modules or components shown in FIG. 1 is only illustrative, and is not intended to limit the scope of the present disclosure in any manner. In other embodiments, the communication system 100 may include any suitable number of first devices, second devices, or other communication devices, and so on. Therefore, the embodiments of the present disclosure are not limited to the specific devices, units, modules, or components depicted in FIG. 1, but are generally applicable to any technical environment in which the interfering device need to be detected. A communication method according to an embodiment of the present disclosure is described below with reference to FIG. 2.

Figure 2:
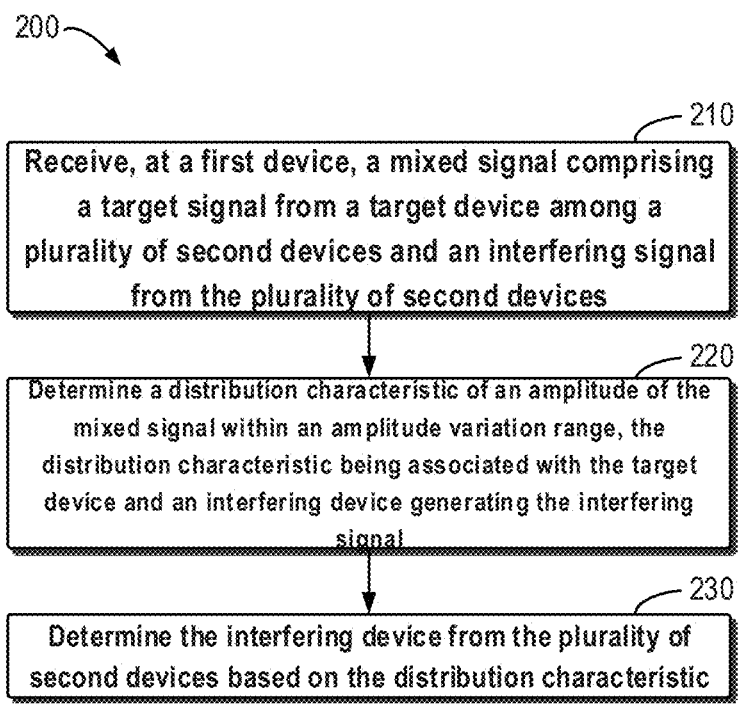
FIG. 2 illustrates an example flowchart of a method for communications according to an embodiment of the present disclosure.

FIG. 2 illustrates an example flowchart of a method 200 for communications according to an embodiment of the present disclosure. In some embodiments, the method 200 may be implemented by the first device 110 in the communication system 100, for example, may be implemented by a processor or a processing unit of the first device 110. In other embodiments, the method 200 may also be implemented by a communication device independent of the communication system 100, or may be implemented by other devices in the communication system 100 (for example, the second devices 120-1 to 120-N). For ease of discussion, the method 200 is discussed with reference to FIG. 1.

At 210, the first device 110 receives the mixed signal 125-H. For example, in a certain time period during the communication between the first device 110 and the second devices 120-1 to 120-N, the first device 110 receives, on the communication channel 130, the mixed signal 125-H from the second device 120-2 and a certain second device 120-R. It should be appreciated that although the mixed signal 125-H is exemplarily described as coming from the second devices 120-2 and 120-R, the mixed signal may come from any two second devices among the second devices 120-1 to 120-N. It should also be understood that although the mixed signal is exemplarily described as coming from two second devices, the mixed signal might also come from three or more second devices, and the embodiments of the present disclosure are equally applicable to such a scene.

As described above, the mixed signal 125-H received by the first device 110 includes the target signal 125-2 that the first device 110 intends to receive and the interfering signal 125-R that the first device 110 does not intend to receive. For example, in the case where the second devices 120-1 to 120-N communicate with the first device 110 in a time division multiplexed manner, in the timeslot allocated to the second device 120-2, the first device 110 intends to receive the target signal 125-2 from the second device 120-2 as the target device. In addition, in this timeslot, the first device 110 does not intend to receive the interfering signal 125-R from other second devices among the second devices 120-1 to 120-N. That is to say, a certain second device 120-R among the second devices 120-1 to 120-N transmits a signal in a timeslot that does not belong to it, but the first device 110 has not yet determined at this time which second device specifically sends out the interfering signal 125-R.

It should be appreciated that the time division multiplexed communication mode described here is only exemplary, and is not intended to limit the scope of the present disclosure in any manner. In other embodiments, the second device 120-2 as the target device may also have an opportunity to communicate with the first device 110 in any other appropriate manner. For example, the second device 120-2 might also send the target signal 125-2 to the first device 110 after the second device 120-2 is randomly accessed to the communication channel 130, while some other second device 120-R in the second devices 120-1 to 120-N sends out the interfering signal 125-R to the first device 110 without undergoing the random access process.

Further referring to FIG. 2, in order to determine which second device among the second devices 120-1 to 120-N sent out the interfering signal 125-R, at 220 the first device 110 determines a distribution characteristic of an amplitude of the mixed signal 125-H within an amplitude variation range to facilitate recognizing the interfering device 120-R. The inventors discovered through research that since each second device may have different inherent parameters when sending a signal to the first device 110, and the signal reaches the first device 110 after being transmitted through different channels, the amplitudes of signals received by the first device 110 from different second devices would have different amplitude distribution characteristics.

More specifically, the amplitude distribution characteristic of the signal sent out by the second device might be related to factors such as a channel distance (e.g., a length of an optical fiber from each of the second devices 120-1 to 120-N to the first device 110), device performance, a device bandwidth, an aging degree of the device and an operation environment (e.g., temperature), and seldom related to or not related to specific information content (e.g., 01 bit string) carried by the signal. Since the above related parameters of each second device are specific to the second device, the first device 110 may recognize which second device sent out the signal through the amplitude distribution characteristic of the received signal. As used herein, signal amplitude may generally refer to the amplitude of any parameter for representing the size or magnitude of the signal, for example, current amplitude, voltage amplitude, power amplitude, and so on.

In order to better understand that the amplitude distribution characteristic of the signal may be used to recognize the second device that sends the signal, the signals with different amplitude distribution characteristics sent out by the second devices 120-1 to 120-N may be compared to "sound" having different "timbre or tone", whereas the first device 110 as the signal receiver may recognize the sender through the amplitude distribution characteristic of the signal. It may be analogized that the first device 110 may determine which second device made the "sound" through the "timbre or tone" of the "sound".

Similarly, a mixed signal composed of signals sent out by two or more second devices would also have a specific amplitude distribution characteristic which is different from the amplitude distribution characteristic of the signal sent out by a single second device, but are associated with a combination of two or more second devices sending out component signals in the mixed signal. For example, in the example scenario of FIG. 1, the amplitude distribution characteristic of the mixed signal 125-H may be different from the amplitude distribution characteristic of the target signal 125-2 and the interfering signal 125-R, but be associated with the target device 120-2 and the interfering device 120-R generating the interfering signal 125-R, that is, associated with the combination of the second devices 120-2 and 120-R. Hence, the first device 110 may recognize which second devices jointly send out the mixed signal through the amplitude distribution characteristic of the received mixed signal.

Continuing to use the above analogous understanding, the mixed signal 125-H may be analogous to the "mixed sound" emitted by two or more second devices, while the amplitude distribution characteristic of the mixed signal 125-H may be analogous to the "mixed timbre or tone" having unique "timbre or tone", which is different from the "timbre or tone" of the "sound" emitted by each individual second device. Through the unique "timbre or tone", the first device 110 may determine a specific combination of two or more second devices that emit the "mixed sound".

It should be appreciated that the first device 110 may determine the amplitude distribution characteristic of the mixed signal 125-H in any suitable manner. For example, in the case where the amplitude of the mixed signal 125-H has a regular distribution within its amplitude variation range, the first device 110 might determine a functional expression of the amplitude distribution of the mixed signal 125-H as its amplitude distribution characteristic. For another example, the first device 110 may take a certain mathematical processing result (e.g., an average value) of the amplitude of the mixed signal 125-H as the distribution characteristic within its amplitude variation range.

In other embodiments, in order to determine the amplitude distribution characteristic of the mixed signal 125-H, the first device 110 may divide the amplitude variation range of the mixed signal 125-H into a plurality of sections. Then, the first device 110 may determine a distribution of the amplitude of the mixed signal 125-H within the plurality of sections resulting from the division. In this way, the first device 110 may determine the overall amplitude distribution characteristic by determining the distribution of the signal amplitude in each small section. For example, based on these sections, the first device 110 might obtain the amplitude distribution characteristic of the mixed signal 125-H through sampling and statistics, which facilitates obtaining inherent or intrinsic amplitude distribution characteristic the mixed signal 125-H from a large number of samples of the mixed signal 125-H.

Generally speaking, the first device 110 may divide the amplitude variation range of the mixed signal 125-H into any number of sections, and the sizes of these sections may be different. The amplitude distribution characteristic of the mixed signal 125-H thus determined may also be used to recognize the interfering device 120-R. However, in some embodiments, in order to improve the accuracy of recognizing the interfering device 120-R, the first device 110 may divide the amplitude variation range of the mixed signal 125-H into a predetermined number of sections of the same size. In addition, the predetermined number of sections of the same size may also simplify the calculation and processing performed by the first device 110 to divide the amplitude variation range into sections, thereby reducing the amount of calculation for calculating the amplitude distribution of the mixed signal 125-H.

It should be understood that the first device 110 may determine the above distribution of the amplitude of the mixed signal 125-H within the plurality of sections in any suitable manner. For example, in a case where the mixed signal 125-H is sampled multiple times, the first device 110 may determine the number of signal samples included in each section in a descending order according to these sections. For another example, the first device 110 may determine the number of signal samples included in each section in any other order. In other embodiments, the first device 110 may determine the amplitude distribution of the mixed signal 125-H based on the correspondence relationship between the plurality of samples of the mixed signal 125-H and the plurality of sections. Such an example should be described in details below with reference to FIG. 3.

Further referring to FIG. 2, at 230, the first device 110, based on the amplitude distribution characteristic of the mixed signal 125-H, determines the interfering device 120-R from the plurality of second devices 120-1 to 120-N. As described above, the amplitude distribution characteristic of the mixed signal 125-H is associated with the combination of the target device 120-2 and the interfering device 120-R. Therefore, based on the association, the first device 110 may recognize that the mixed signal 125-H is jointly sent out by the target device 120-2 and the interfering device 120-R. In addition, the first device 110 may also know that the target device 120-2 is the intended signal sending device, and the interfering device 120-R is not allowed to send a signal at this time. Furthermore, the first device 110 may determine which specific second device is the interfering device 120-R from the plurality of second devices 120-1 to 120-N.

As described above, in some embodiments, the first device 110 may determine the amplitude distribution of the mixed signal 125-H based on the correspondence relationship between the plurality of samples of the mixed signal 125-H and the plurality of sections. Such an example is described in details below with reference to FIG. 3.

Figure 3:
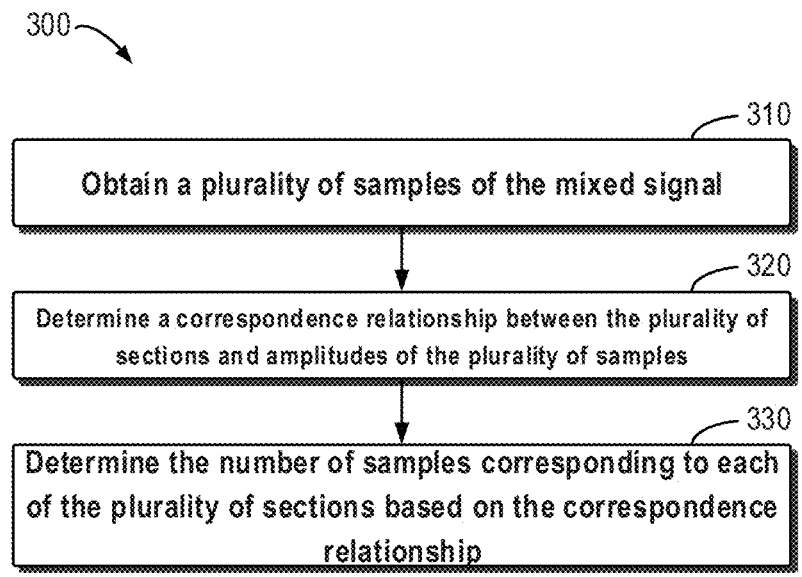
FIG. 3 illustrates an example flowchart of an exemplary process for determining the distribution of a signal amplitude of a mixed signal within a plurality of sections according to an embodiment of the present disclosure.

FIG. 3 illustrates an example flowchart of an exemplary process 300 for determining a distribution of the signal amplitude of the mixed signal 125-H within the plurality of sections according to an embodiment of the present disclosure. In some embodiments, the process 300 may be implemented by the first device 110 in the communication system 100, for example, may be implemented by a processor or a processing unit of the first device 110. In other embodiments, the process 300 may also be implemented by a communication device independent of the communication system 100, or may be implemented by other devices in the communication system 100 (for example, the second devices 120-1 to 120-N). For ease of discussion, the process 300 is discussed with reference to FIG. 1.

At 310, the first device 110 may obtain a plurality of samples of the mixed signal 125-H. Generally speaking, the mixed signal 125-H would last for a certain time period in the time domain. Therefore, the first device 110 may sample the mixed signal 125-H during this time period, thereby obtaining the plurality of samples of the mixed signal 125-H. For example, in the case where the first device 110 is an optical line terminal, the sampling may be performed by an analog-to-digital converter in the optical line terminal for realizing signal equalization. In other embodiments, the first device 110 may also use a dedicated sampler to perform sampling of the mixed signal 125-H.

In some embodiments, the first device 110 may obtain the plurality of samples of the mixed signal 125-H at a predetermined time interval (for example, several microseconds, milliseconds, etc.), so that sampling can be evenly performed during the duration of the mixed signal 125-H. In other embodiments, the first device 110 may also obtain a predetermined number of samples of the mixed signal 125-H, for example, thousands of samples, tens of thousands of samples, etc., to obtain the same number of samples for signals with different durations. In other embodiments, the first device 110 may sample the mixed signal 125-H in any other suitable manner. The embodiment of the present disclosure does not limit the specific sampling manners.

At 320, the first device 110 may determine the correspondence relationship between the amplitude of the plurality of samples of the mixed signal 125-H and the plurality of sections divided from the amplitude variation range. As described above, the amplitude variation range of the mixed signal 125-H may be divided into a plurality of sections. Therefore, for a certain sample of the mixed signal 125-H, the first device 110 may determine the correspondence relationship between the amplitude of the sample and a certain section of the foregoing plurality of sections, for example, the amplitude of the sample falls within the section. By doing so, for each sample of the mixed signal 125-H, the first device 110 may make a similar determination, thereby determining the correspondence relationship between the amplitudes of the plurality of samples of the mixed signal 125-H and the plurality of sections.

It should be noted that the first device 110 may represent the above-mentioned correspondence relationship between the plurality of samples and the plurality of sections in any suitable manner. For example, the first device 110 may create a table to record such correspondence relationship using the plurality of samples and the plurality of sections as rows and columns (or vice versa), respectively. For another example, the first device 110 may store the above correspondence relationship using a data structure such as an array or a data form. In other embodiments, the first device 110 may also use a histogram to represent the correspondence relationship between the amplitudes of the plurality of samples of the mixed signal 125-H and the plurality of sections, thereby representing the amplitude distribution of the mixed signal 125-H and this correspondence relationship more visually and vividly. Such an example is described hereunder in details with reference to FIG. 4.

Figure 4:
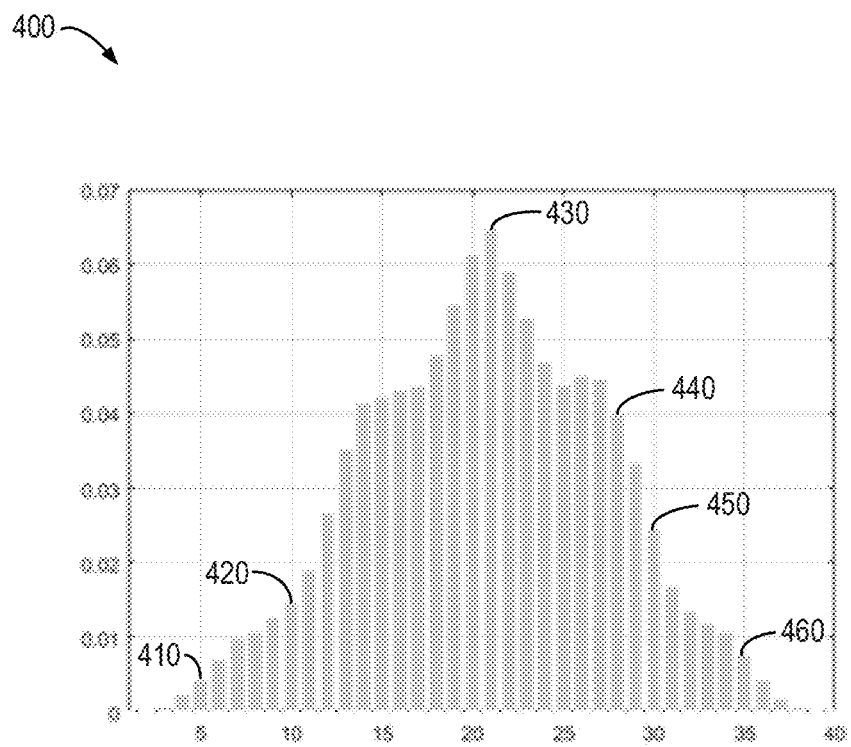
FIG. 4 illustrates example distribution characteristics of the signal amplitude of a mixed signal represented by a histogram according to an embodiment of the present disclosure.

FIG. 4 illustrates example distribution characteristic of the signal amplitude of the mixed signal 125-H represented by a histogram 400 according to an embodiment of the present disclosure. As shown in FIG. 4, the amplitude variation range of the mixed signal 125-H may be divided into a predetermined number (40 in this example) of sections of the same size after being normalized. In FIG. 4, a horizontal axis represents the 40 sections, and a longitudinal axis represents a percentage of the number of samples of the mixed signal 125-H corresponding to a certain section in the total number of samples. It should be understood that performing normalization processing of the amplitude variation range of the mixed signal 125-H is optional. In other embodiments, the amplitude variation range may be directly divided into the plurality of sections without undergoing the normalization processing.

In the example histogram 400 in FIG. 4, column (or bar) 410 represents that the number of samples in the fifth section accounts for about 0.4% of the total number of samples, and column (or bar) 420 represents the number of samples in the $10^{th}$ section accounts for about 1.5% of the total number of samples, column (or bar) 430 represents that the number of samples in the $21^{st}$ section accounted for about 6.5% of the total number of samples, and column (or bar) 440 represents the number of samples in the $28^{th}$ section accounts for about 4% of the total number of samples, column (or bar) 450 represents that the number of samples in the $30^{th}$ section accounts for about 2.5% of the total number of samples, and column (or bar) 460 represents that the number of samples in the $35^{th}$ section accounts for about 0.8% of the total number of samples, and so on.

Referring back to FIG. 3, at 330, based on the correspondence relationship between the plurality of samples of the mixed signal 125-H and the plurality of sections, the first device 110 may determine the number of samples corresponding to each of the plurality of sections, thereby obtaining the amplitude distribution characteristic of the mixed signal 125-H. For example, in the example depicted in FIG. 4, assuming that the number of samples is 10,000, the number of samples corresponding to the fifth section is about 40, the number of samples corresponding to the $10^{th}$ section is about 150, the number of samples corresponding to the $21^{st}$ section is about 650, the number of samples corresponding to the $28^{th}$ section is about 400, the number of samples corresponding to the $30^{th}$ section is about 250, and the number of samples corresponding to the $35^{th}$ section is about 80, and so on. It should be appreciated that equivalent to the number of samples in each section, the percentage of each column shown by the longitudinal axis of the histogram 400 of FIG. 4 may also represent the amplitude distribution characteristic of the mixed signal 125-H.

With the exemplary process 300 being used, the efficiency of the first device 110 in determining the distribution of the amplitude of the mixed signal 125-H in plurality of sections may be improved. In addition, it should be understood that the various numerical values listed above with respect to FIG. 4 are only exemplary and are not intended to limit the scope of the present disclosure in any manner. In other embodiments, the amplitude variation range of the mixed signal 125-H may be divided into any appropriate number of sections, the number of samples in each section accounts for any proper percentage of the total number of samples, and the total number of samples may be any proper number.

As mentioned above, the embodiments of the present disclosure may achieve the detection of the interfering device 120-R without affecting the normal operation or normal communication of the first device 110 and the second devices 120-1 to 120-N. Such an example is specifically described below with reference to FIG. 5.

Figure 5:
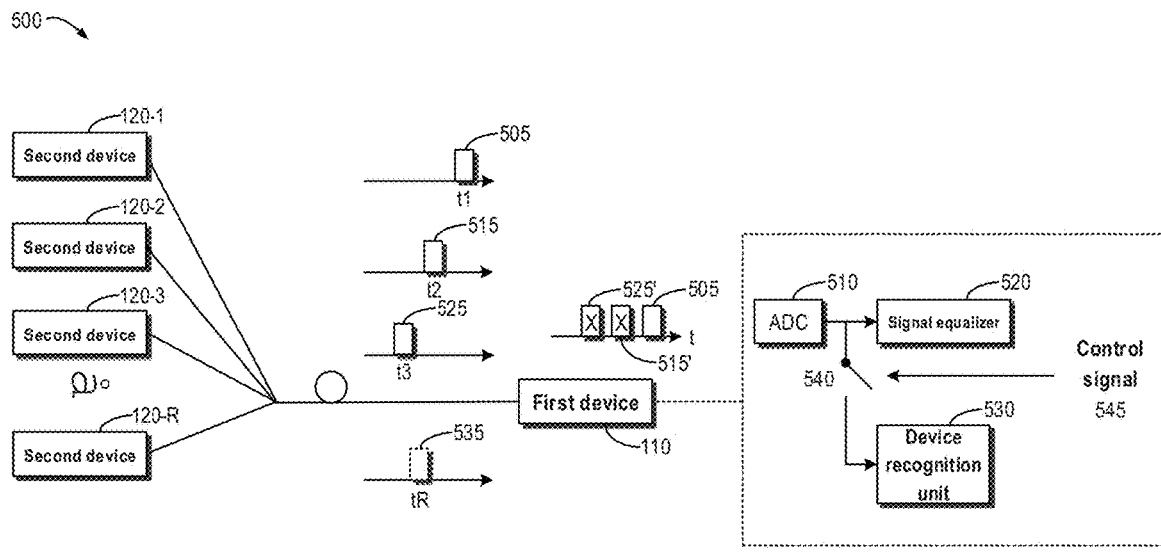
FIG. 5 illustrates a schematic diagram of a real-time detection scenario of an interfering device implemented in parallel with normal signal transceiving according to an embodiment of the present disclosure.

FIG. 5 illustrates a schematic diagram of a real-time detection scenario 500 of an interfering device 120-R implemented in parallel with normal signal transceiving according to an embodiment of the present disclosure. In the example of FIG. 5, it is assumed that the first device 110 and the second devices 120-1 to 120-N are in a normal communication period. The second device 120-1 sends a signal 505 to the first device 110 in a time period t1, the second device 120-2 sends a signal 515 to the first device 110 in a time period t2, the second device 120-3 sends a signal 525 to the first device 110 in a time period t3, and the second device 120-R as an interfering device sends an interfering signal 535 to the first device 110 in a time period tR.

As shown in FIG. 5, the time period tR overlaps the time period t2 and time period t3, but does not overlap the time period t1. Therefore, on the receiving side, the first device 110 may receive the signal 505 correctly, but cannot receive the signal 515 and the signal 525 correctly. Conversely, the first device 110 receives the mixed signal 515' of the signal 515 and the interfering signal 535, and receives the mixed signal 525' of the signal 525 and the interfering signal 535.

In some embodiments, the first device 110 may include an Analog-to-Digital Converter (ADC) 510 and a signal equalizer 520. During normal operation, the Analog-to-Digital Converter 510 may perform analog-to-digital conversion on the signal received by the first device 110, and then provide the digital signal obtained from the conversion to the signal equalizer 520 for signal equalization processing, so as to perform equalization and compensation for signal distortion caused by long-distance, high-speed signal transmission.

In addition, the first device 110 may further include a device recognition unit 530, which may recognize which second device in the second devices 120-1 to 120-N is the interfering device 120-R based on the amplitude distribution characteristics of the mixed signal 515' or signal 525'. In the example of FIG. 5, the device recognition unit 530 may be connected to the output of the analog-to-digital converter 510 through a switch 540, thereby obtaining samples of the mixed signal 515' or 525' from the analog-to-digital converter 510 when the switch 540 is closed.

As shown in FIG. 5, the first device 110 may use the control signal 545 to control the closing and opening of the switch 540, so as to provide the output of the analog-to-digital converter 510 to the device recognition unit 530 when the interfering device 120-R needs to be recognized. For example, if the first device 110 determines that the mixed signal 515' or signal 525' is received, the first device 110 may turn on the switch 540 to provide the output of the analog-to-digital converter 510 to the device recognition unit 530, and the output may include a plurality of samples of the mixed signal 515' or 525'. Therefore, the device recognition unit 530 may recognize the interfering device 120-R by determining the amplitude distribution characteristics of the mixed signal 515' or 525'.

In some embodiments, the control signal 545 may include an indication to detect the interfering device 120-R. In other words, when the first device 110 finds that the interfering device 120-R is sending the interfering signal 535, the first device 110 may send out an instruction to detect the interfering device 120-R, so that the device recognition unit 530 operates and obtains the samples of the mixed signal 515' or 525', thereby recognizing the interfering device 120-R. Conversely, when there is no instruction to detect the interfering device (for example, when there is no interfering device), the interfering device detecting function (for example, the device recognition unit 530) of the first device 110 may be turned off, disconnected, deactivated, or in a sleep state to save power and resources of the first device 110, without interrupting any function of the communication network (for example, a passive optical network) and without increasing the signaling overhead in the MAC message.

It should be appreciated that FIG. 5 only schematically shows devices, units, modules, or components in the communication system 100 related to the embodiments of the present disclosure. In practice, the first device 110 may further include other devices, units, modules or components for other functions, or devices, units, modules, or components different from those in FIG. 5. In addition, the specific number of devices, units, modules or components shown in FIG. 5 is only illustrative, and is not intended to limit the scope of the present disclosure in any manner. In other embodiments, the first device 110 may include any suitable number of devices, units, modules or components. An example implementation of the device recognition unit 530 is described in details below with reference to FIG. 6.

Figure 6:
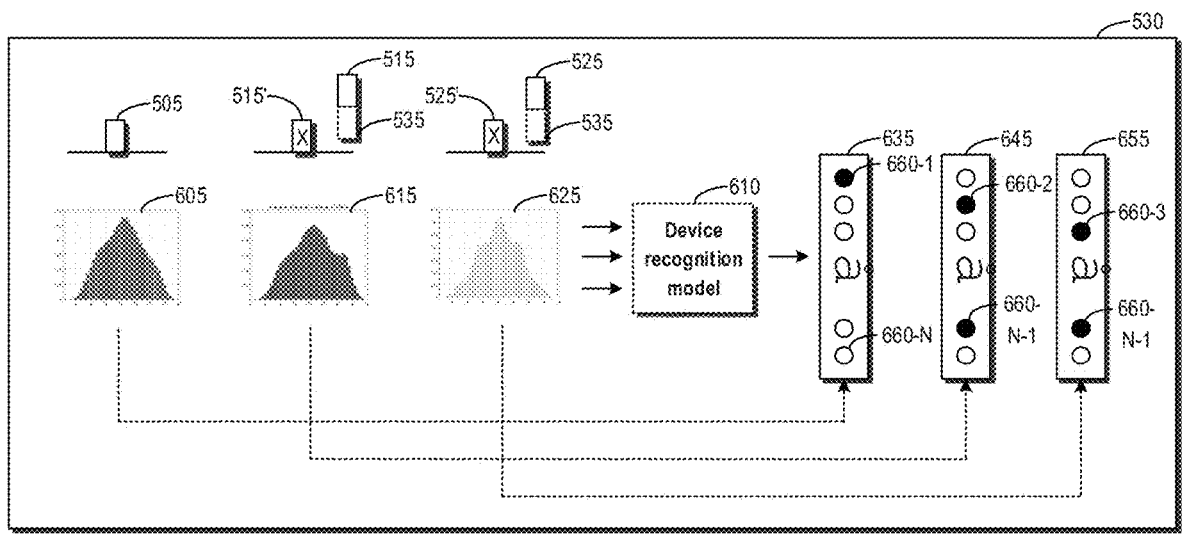
FIG. 6 illustrates example details of a device recognition unit in a first device according to an embodiment of the present disclosure.

FIG. 6 illustrates example details of a device recognition unit 530 in a first device according to an embodiment of the present disclosure. In the example of FIG. 6, the device recognition unit 530 may include a device recognition model 610 characterizing associations between distribution characteristics of signals and second devices 120-1 to 120-N. In other words, the device recognition model 610 may recognize which device(s) sends (send) out the signal from the distribution characteristic of the signal.

In a case where a histogram is used to represent the distribution characteristics, the device recognition model 610 converts an "interfering device detection issue" into a "graph pattern recognition issue". In some embodiments, the device recognition model 610 may include a neural network (NN)-based model to improve the accuracy of graph pattern recognition. In other embodiments, the device recognition model 610 may also be other machine learning models, or other non-machine learning-based models (such as mathematical models, and the like) that implement device recognition based on certain distribution characteristics.

As shown in FIG. 6, the first device 110 may input the distribution characteristic 605 of the signal 505 into the device recognition model 610 to perform device recognition. After recognizing that the signal 505 is sent out by the second device 120-1, the device recognition model 610 may output indication information 635 for indicating the second device 120-1. In the example of FIG. 6, the indication information 635 includes a plurality of indicators 660-1 to 660-N, which correspond to the second devices 120-1 to 120-N, respectively. In the indication information 635, the indicator 660-1 corresponding to the second device 120-1 may be highlighted (for example, lit) to indicate that the sender of the first signal 505 is the second device 120-1.

Similarly, in order to determine which second device is the interfering device 120-R, the first device 110 may input the distribution characteristic 615 of the mixed signal 515' including the signal 515 and the interfering signal 535 into the device recognition model 610 to perform device recognition. The device recognition model 610 may immediately recognize the interfering device 120-R (for example, provide a device ID), even for the interfering signal 535 that lasts for a short time. After recognizing that the mixed signal 515' is sent out by the second device 120-2 and the interfering device (the second device 120-N−1 in this example), the device recognition model 610 may output indication information 645 for indicating the second device 120-2 and the second device 120-N−1.

In the example of FIG. 6, the indication information 645 includes a plurality of indicators 660-1 to 660-N, which correspond to the second devices 120-1 to 120-N, respectively. In the indication information 645, the indicators 660-2 and 660-N−1 corresponding to the second device 120-2 and the second device 120-N−1 may be highlighted (for example, lit) to indicate that the senders of the mixed signal 515' are the second device 120-2 and the second device 120-N−1. Further, since the first device 110 may know that the second device 120-2 is the target signal sender (i.e., the intended signal sender) during the time period t2, the first device 110 may further determine that the second device 120-N−1 is the interfering device 120-R that sends out the interfering signal 535.

Similarly, the first device 110 may input the distribution characteristic 625 of the mixed signal 525' including the signal 525 and the interfering signal 535 into the device recognition model 610 to perform device recognition. After recognizing that the mixed signal 525' is sent out by the second device 120-3 and the interfering device (the second device 120-N−1 in this example), the device recognition model 610 may output indication information 655 for indicating the second device 120-3 and the second device 120-N−1.

In the example of FIG. 6, the indication information 655 includes a plurality of indicators 660-1 to 660-N, which correspond to the second devices 120-1 to 120-N, respectively. In the indication information 655, the indicators 660-3 and 660-N−1 corresponding to the second device 120-3 and the second device 120-N−1 may be highlighted (for example, lit) to indicate that the senders of the signal 525' are the second device 120-3 and the second device 120-N−1. Further, since the first device 110 may know that the third device 120-3 is the target signal sender during the time period t3, the first device 110 may further determine that the second device 120-N−1 is the interfering device 120-R that sends out the interfering signal 535.

It may be seen that in order to determine which second device is the interfering device 120-R, the first device 110 may obtain a general-purpose device recognition model 610 characterizing associations between distribution characteristics of signals and second devices 120-1 to 120-N. Then, the first device 110 may determine that the interfering device 120-R is the second device 120-N−1 from the second devices 120-1 to 120-N by applying the distribution characteristics 615 or 625 of the mixed signal 515' or 525' to the device recognition model 610. With the general-purpose device recognition model 610 being used, the first device 110 may use a large amount of historical data to conduct intensive training on the device recognition model 610, thereby continuously making it more accurately and comprehensively characterize the associations between distribution characteristics of signals and second devices 120-1 to 120-N, thereby improving the recognition accuracy of the device recognition model 610.

It should be understood that FIG. 6 only schematically shows devices, units, modules, or components in the device recognition unit 530 related to the embodiments of the present disclosure. In practice, the device recognition unit 530 may further include other devices, units, modules, or components for other functions, or devices, units, modules, or components different from those in FIG. 6. In addition, the specific number of devices, units, modules, components, and the indication manner of the second device shown in FIG. 6 are only illustrative, and are not intended to limit the scope of the present disclosure in any manner. In other embodiments, the device recognition unit 530 may include any suitable number of devices, units, modules, or components, and may indicate one or more second devices in any manner.

Figure 7:
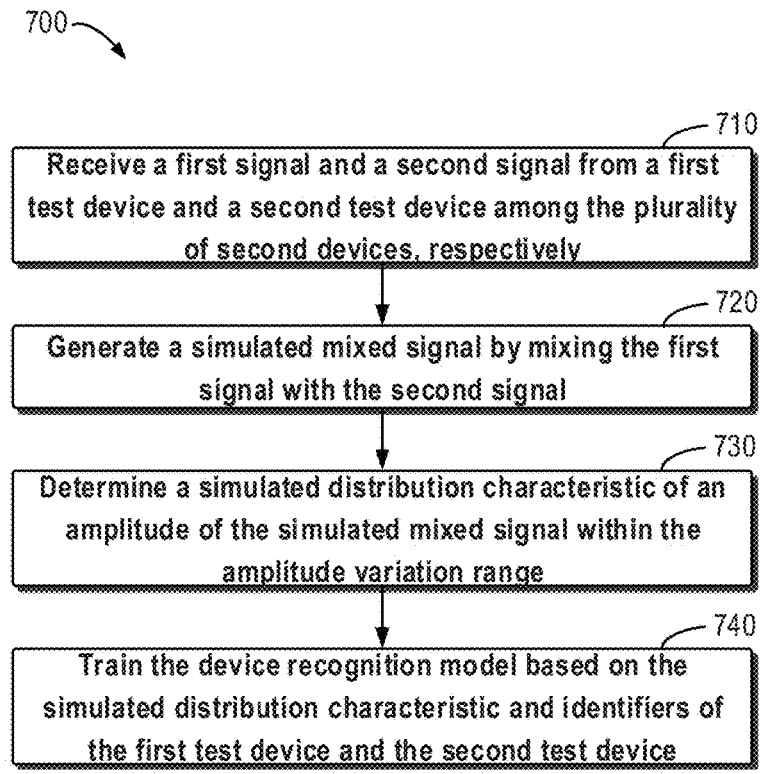
FIG. 7 illustrates an example flowchart of an exemplary process for acquiring a device recognition model according to an embodiment of the present disclosure.

FIG. 7 illustrates an example flowchart of an exemplary process 700 for acquiring a device recognition model 610 according to an embodiment of the present disclosure. In some embodiments, the process 700 may be implemented by the first device 110 in the communication system 100, for example, may be implemented by a processor or a processing unit of the first device 110. In other embodiments, the process 700 may also be implemented by a communication device independent of the communication system 100, or may be implemented by other devices in the communication system 100 (for example, the second devices 120-1 to 120-N). For ease of discussion, process 700 is discussed with reference to FIG. 1.

In order to enable the device recognition model 610 to recognize the amplitude distribution characteristic of the mixed signals from a plurality of second devices, the first device 110 may use the mixed signals including the signals of the plurality of second devices to train the device recognition model 610, so that the device recognition model 610 has the ability to recognize the mixed signal. Therefore, as shown in FIG. 7, at 710, the first device 110 may receive a first signal and a second signal from a first test device and a second test device among the second devices 120-1 to 120-N, respectively. It should be noted that the first test device and the second test device here may be any two second devices among the second devices 120-1 to 120-N. In some embodiments, the first device 110 may receive the first signal and the second signal during the normal operation of the communication network without interrupting the communication in the communication network. Such an example is described below with reference to FIG. 8.

Figure 8:
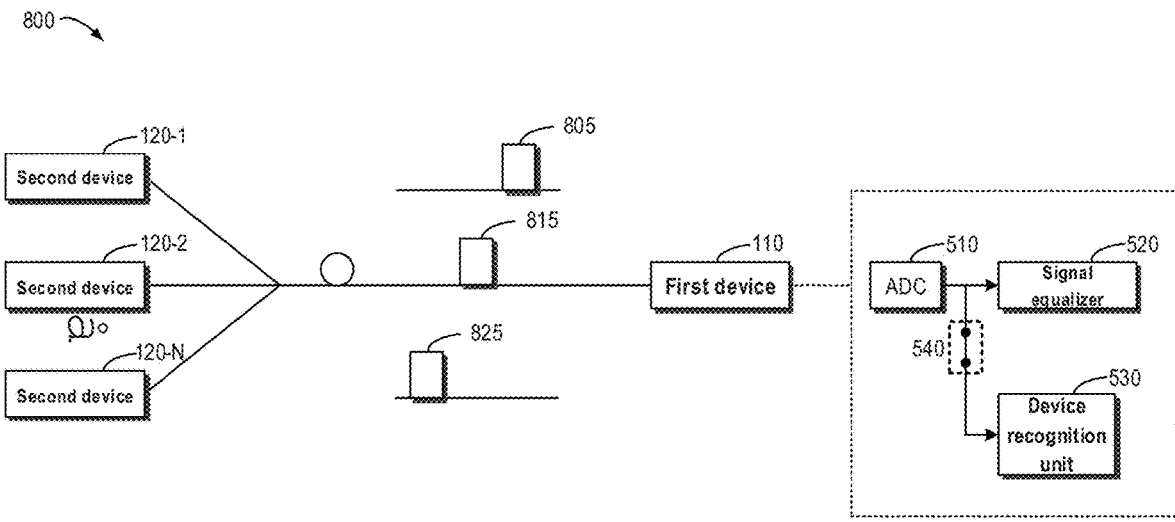
FIG. 8 illustrates a schematic diagram of a first device collecting signals for training the device recognition model without interrupting the normal operation of the communication system according to an embodiment of the present disclosure.

FIG. 8 illustrates a schematic diagram of the first device 110 collecting signals for training the device recognition model 610 without interrupting the normal operation of the communication system 100 according to an embodiment of the present disclosure. In the example of FIG. 8, it is assumed that the first device 110 and the second devices 120-1 to 120-N are during normal operation, and the second devices 120-1 and 120-2 are the first test device and the second test device, respectively. In such a scenario, the second device 120-1 may send the first signal 805 to the first device 110, the second device 120-2 may send the second signal 815 to the first device 110, and the second device 120-N may send a signal 825 to the first device 110, and so on. In other words, the first device 110 may receive a corresponding signal from each of the second devices 120-1 to 120-N for subsequent processing and training of the device recognition model 610.

As shown in FIG. 8, during the acquisition of the signals for training the device recognition model 610, the switch 540 for controlling the device recognition unit 530 may be kept closed, so that during normal operation or normal communication of the first device 110 and the second devices 120-1 to 120-N, the first device 110 may receive the first signal 805 and the second signal 815 from the first test device 120-1 and the second test device 120-2, respectively. In fact, during the normal operation of the communication network, the first device 110 may continuously receive signals from the second devices 120-1 to 120-N for training the device recognition model 610. After obtaining the first signal 805 and the second signal 815, the first device 110 may mix the first signal 805 with the second signal 815 to generate a simulated mixed signal for training the device recognition model 610. Such an example is described below with reference to FIG. 9.

Figure 9:
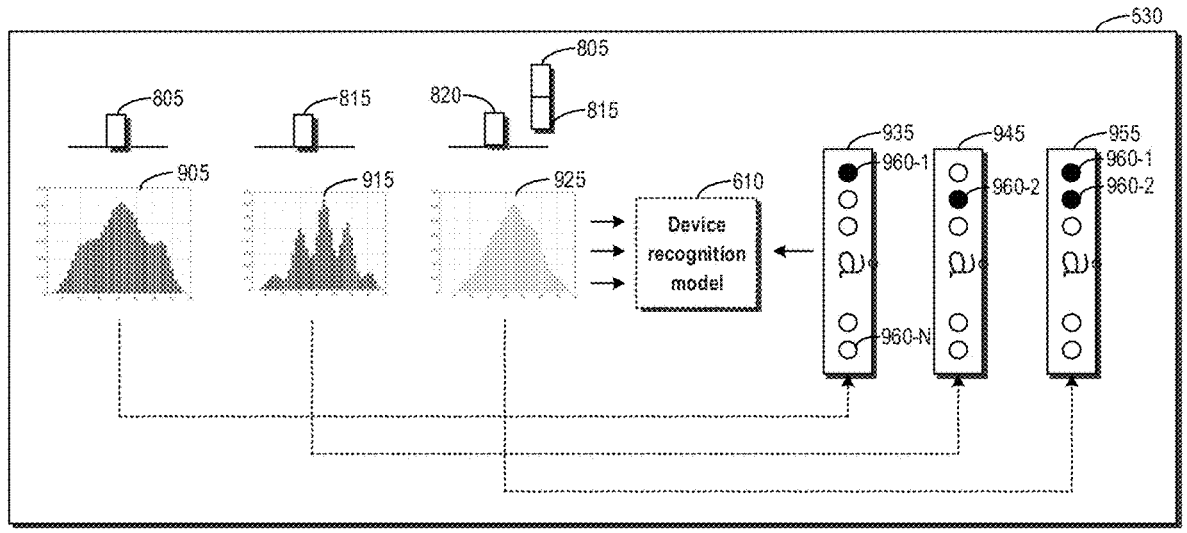
FIG. 9 illustrates a schematic diagram of training the device recognition model using a measurement signal and a simulated mixed signal according to an embodiment of the present disclosure.

FIG. 9 illustrates a schematic diagram of training the device recognition model 610 using measurement signals 805, 815 and a simulated mixed signal 820 according to an embodiment of the present disclosure. In the example of FIG. 9, the signal 805 of the second device 120-1, the signal 815 of the second device 120-2, and the mixed signal 820 of the signal 805 and the signal 815 are used as examples to describe an example manner of training the device recognition model 610. It should be appreciated that the first device 110 may similarly train the device recognition model 610 for any other combinations of a plurality of second devices.

Referring to FIG. 7 and FIG. 9, at block 720 of FIG. 7, the first device 110 may generate a simulated mixed signal 820 by mixing the first signal 805 with the second signal 815. Since the mixed signal 820 is not produced in reality, but is generated at the first device 110 for training the device recognition model 610, the simulated mixed signal 820 may also be referred to as a "self-made" mixed signal herein. In some embodiments, in the process of mixing the first signal 805 with the second signal 815, the first device 110 may mix sample points corresponding to the first signal 805 and the second signal 815, for example, sum up the amplitudes of two sample points corresponding to time domain positions. In other embodiments, the first device 110 may also mix simulated signals of the first signal 805 and the second signal 815 before sampling, that is, add up the signal amplitudes of the two in the time domain. In another embodiment, the first signal 805 and the second signal 815 may also be mixed in other appropriate manners, as long as the resultant simulated mixed signal 820 may reflect the amplitude distribution characteristic of a real mixed signal generated by the time-domain mixing of the signals of the second device 120-1 and the second device 120-2 on the channel 130.

At 730, the first device 110 may determine a simulated distribution characteristic 925 of an amplitude of the simulated mixed signal 820 within the amplitude variation range. For example, the first device 110 may determine the simulated distribution characteristic 925 in a manner similar to that of determining the amplitude distribution characteristic of the mixed signal 125 as described above with respect to FIG. 2 through FIG. 4, which will not be repeated any more here.

At 740, the first device 110 may train the device recognition model 610 based on the simulated distribution characteristic 925 and identifiers of the first test device 120-1 and the second test device 120-2. In some embodiments, the first test device 120-1 and the second test device 120-2 may have respective identifiers (such as device IDs and the like) for training the device recognition model 610. In other embodiments, the first device 110 may use one identifier to indicate the combination of the first test device 120-1 and the second test device 120-2 for training the device recognition model 610. For example, N bits may be used to indicate N second devices 120-1 to 120-N, respectively, and 110 . . . 0 (N bits) may be used to indicate a combination of the second devices 120-1 and 120-2. It should be understood that the device recognition model 610 trained using the simulated distribution characteristic 925 of the simulated mixed signal 820 may be used to recognize the mixed signal generated by the interfering signal of the second device 120-1 interfering with the target signal of the second device 120-2, or recognize the mixed signal generated by the interfering signal of the second device 120-2 interfering with the target signal of the second device 120-1.

For example, the first device 110 may provide the distribution characteristic 925 of the mixed signal 820 of the first signal 805 and the second signal 815 to the device recognition model 610 as a model input, and provide instruction information 955 of the second devices 120-1 and 120-2 to the device recognition model 610 as a model output, so as to train model parameters such as weights and biases of neurons in the neural network and the like, for characterizing associations between distribution characteristics of signals and second devices 120-1 to 120-N in the device recognition model 610.

In the example of FIG. 9, the indication information 955 includes a plurality of indicators 960-1 to 960-N, which correspond to the second devices 120-1 to 120-N, respectively. In the indication information 955, the indicators 960-1 and 960-2 corresponding to the second devices 120-1 and 120-2 may be highlighted (for example, lit) to indicate that the senders of the mixed signal 820 are the second devices 120-1 and 120-2.

It should be noted that upon determining the simulated distribution characteristic 925, the first device 110 needs to first produce the mixed signal 820, and then determine the simulated distribution characteristics 925 based on the mixed signal 820, rather than directly summing up the distribution characteristic 905 of the first signal 805 and the distribution characteristic 915 of the second signal 815. For example, if the amplitude of a certain sample of the first signal 805 is 0.5, and the amplitude of the corresponding sample of the second signal 815 is −0.5, then the amplitude of the sample at the mixed signal 820 of the first signal 805 and the second signal 815 would become 0. This means that relative to the distribution characteristic 905 of the first signal 805 and the distribution characteristic 915 of the second signal 815, the number of samples in the distribution characteristic 925 of the mixed signal 820 within the section of amplitude 0.5 and −0.5 each would be reduced by one, and the number of samples within the section of amplitude 0 would increase by one. If the distribution characteristic 905 and the distribution characteristic 915 are directly added, the correct distribution characteristic 925 of the mixed signal 820 cannot be obtained.

In addition, it should be noted that in the scenario of recognizing interfering devices for mixed signals, the first device 110 may train the device recognition model 610 by only using the amplitude distribution characteristics of the mixed signals of the plurality of second devices to enable the device recognition model 610 to recognize which second devices send out the mixed signals. However, in some embodiments, it might be beneficial to additionally use the amplitude distribution characteristic of the signal sent out by a single second device to train the device recognition model 610, which may improve the recognition accuracy of the device recognition model 610. For example, the device recognition model 610 trained with the signal sent out by a single second device may avoid misrecognizing the distribution characteristic of a signal similar to a signal of a certain device as the distribution characteristic of the mixed signal.

Therefore, as shown in FIG. 9, the first device 110 may provide the distribution characteristic 905 of the first signal 805 as a model input to the device recognition model 610, and provide the indication information 935 for indicating the second device 120-1 as a model output to the device recognition model 610, so as to train model parameters such as weights and biases of neurons in the neural network and the like, for characterizing associations between distribution characteristics of signals and second devices 120-1 to 120-N in the device recognition model 610. In the example of FIG. 9, the indication information 935 includes a plurality of indicators 960-1 to 960-N, which correspond to the second devices 120-1 to 120-N, respectively. In the indication information 935, the indicator 960-1 corresponding to the second device 120-1 may be highlighted (for example, lit) to indicate that the sender of the first signal 805 is the second device 120-1.

Similarly, the first device 110 may provide the distribution characteristic 915 of the second signal 815 as a model input to the device recognition model 610, and provide the indication information 945 for indicating the second device 120-2 as a model output to the device recognition model 610, so as to train model parameters such as weights and biases of neurons in the neural network and the like, for characterizing associations between distribution characteristics of signals and second devices 120-1 to 120-N in the device recognition model 610. In the example of FIG. 9, the indication information 945 includes a plurality of indicators 960-1 to 960-N, which correspond to the second devices 120-1 to 120-N, respectively. In the indication information 945, the indicator 960-2 corresponding to the second device 120-2 may be highlighted (for example, lit) to indicate that the sender of the first signal 815 is the second device 120-2.

Through the exemplary process 700, the first device 110 may use the amplitude distribution characteristic of the mixed signal of the second devices 120-1 to 120-N in a targeted manner to train the device recognition model 610, thereby improving the accuracy of the device recognition model 610 in recognizing the mixed signal of signals sent from two or more second devices. It should be understood that the specific number of devices, units, modules, components, and the indication manners of the second device shown in FIG. 8 and FIG. 9 are only illustrative, and are not intended to limit the scope of the present disclosure in any manner. In other embodiments, any appropriate number of devices, units, modules or components may be included in the scenes of FIG. 8 and FIG. 9, and one or more second devices may be indicated in any manner.

Figure 10:
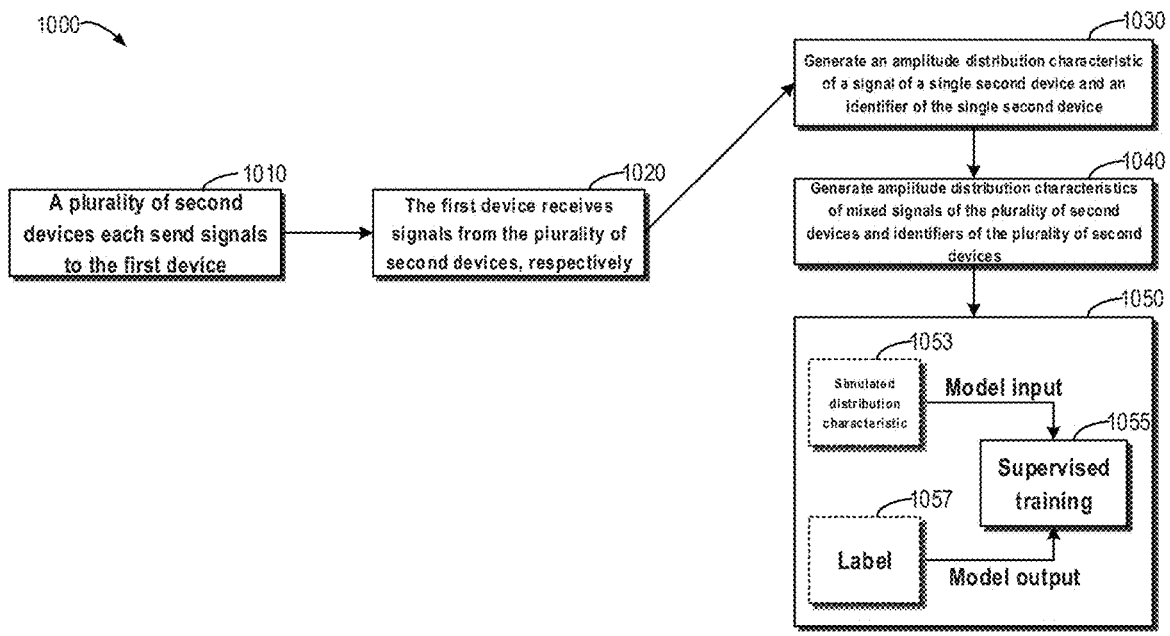
FIG. 10 illustrates a flowchart of a schematic process for training the device recognition model according to an embodiment of the present disclosure.

FIG. 10 illustrates a flowchart of a schematic process 1000 for training the device recognition model according to an embodiment of the present disclosure. In some embodiments, the process 1000 may be implemented by the first device 110 and the second devices 120-1 to 120-N in the communication system 100, for example, it may be implemented by processors or processing units of the first device 110 and the second devices 120-1 to 120-N. In other embodiments, the process 1000 may also be implemented by a communication device independent of the communication system 100, or may be implemented by other devices in the communication system 100. For ease of discussion, the process 1000 is discussed with reference to FIG. 1.

As shown in FIG. 10, at 1010, the second devices 120-1 to 120-N may each send signals to the first device 110. For example, in a time-division multiplexed communication scenario, the second devices 120-1 to 120-N may sequentially send signals to the first device 110 in their respective allocated timeslots. Correspondingly, at 1020, the first device 110 may receive the signals of the respective second devices 120-1 to 120-N from the second devices 120-1 to 120-N, respectively. It should be appreciated that the functions described in blocks 1010 and 1020 are conventional communication functions of the first device 110 and the second device 120, and the embodiments of the present disclosure may not change this portion of functions.

At 1030, the first device 110 may generate the amplitude distribution characteristic of the signal of a single second device and an identifier of the single second device. For example, the first device 110 may generate the amplitude distribution characteristic of the signal sent out by the second device 120-1 and the identifier of the second device 120-1, and then store the "amplitude distribution characteristic-identifier" of the second device 120-1 in pair into a database. In the same manner, for each second device, the first device 110 may perform similar operations until the amplitude distribution characteristics of the signal sent out by the second device 120-N and the identifier of the second device 120-N are generated, and then the "amplitude distribution characteristic-identifier" of the second device 120-N in pair into the database.

As noted above, although in order to enable the device recognition model 610 to recognize the mixed signal from a plurality of second devices, the device recognition model 610 may also not be trained using the signal of a single second device, but it might be beneficial to additionally use the amplitude distribution characteristic of the signal sent out by a single second device to train the device recognition model 610, which may improve the recognition accuracy of the device recognition model 610. For example, the device recognition model 610 trained with the signal sent out by a single second device may avoid misrecognizing the distribution characteristic of a signal similar to a signal of a certain device as the distribution characteristic of the mixed signal.

At 1040, the first device 110 may generate the amplitude distribution characteristics of the mixed signals of the plurality of second devices and identifiers of the plurality of second devices. For example, the first device 110 may generate the amplitude distribution characteristic of the mixed signal sent out by the second device 120-1 and the second device 120-2 and the identifiers of the second device 120-1 and the second device 120-2, and then store the "amplitude distribution characteristics-identifiers" of the combination of the second devices 120-1 and 120-2 in pairs into the database. In the same manner, for each combination of second devices, the first device 110 may perform similar operations until the amplitude distribution characteristic of the mixed signal sent out by the second device 120-N–1 and second device 120-N and the identifiers of the second device 120-N–1 and second device 120-N are generated, and then store the "amplitude distribution characteristics-identifiers" of the combination of the second devices 120-N–1 and 120-N in pairs into the database. The number of combinations of any two second devices selected from the N second devices 120-1 to 120-N may be represented by a mathematic symbol $C_N^2$.

It should be understood that the first device 110 may also generate the distribution characteristic of the mixed signal and identifiers for a combination of a larger number (for example, three, four, five, etc.) of the second device for training the device recognition model 610. This may further improve the recognition accuracy of the device recognition model 610, but requires more resources (for example, computing resources, storage resources, etc.) of the first device 110 for generating these mixed signals and subsequent training. In addition, in real scenarios, it may be relatively uncommon for more than one interfering device to appear. Therefore, in practice, the administrator or user of the first device 110 may decide a maximum number of second devices for generating mixed signals according to specific technical environment and design requirements, to achieve a good compromise between the required resources of the device recognition model 610 and the recognition accuracy.

At 1050, the first device 110 may train the device recognition model 610. For example, in a case where the device recognition model 610 is a machine learning model (such as a neural network model), the first device 110 may perform supervised training 1055 on the device recognition model

610. Specifically, the first device 110 may provide the simulated distribution characteristics 1053 of the signals and mixed signal generated in blocks 1030 and block 1040 as a model input to the device recognition model 610. For example, the simulated distribution characteristics 1053 may be represented in the form of a histogram, and the number or percentage indicated by each column in the histogram may serve as the input of the device recognition model 610.

On the other hand, the first device 110 may provide the identifiers of the second devices corresponding to the amplitude distribution characteristics of the signals and generated in blocks 1030 and 1040 as a model output to the device recognition model 610, that is, a label 1057 used in supervised training 1055. In some embodiments, the label 1057 may be encoded in a 1-hot or 2-hot manner. For example, N bits may be used to represent N second devices 120-1 to 120-N, 100 . . . 0 (N bits) may be used to represent the second device 120-1, 010 . . . 0 (N bits) may be used to represent the second device 120-2, 000 . . . 1 (N bit) may be used to indicate the second device 120-N, and 110 . . . 0 (N bit) may be used to represent the combination of the second device 120-1 and 120-2, and so on. In other embodiments, the label 1057 may include any suitable identifiers distinguishable among the second devices 120-1 to 120-N.

Figure 11:
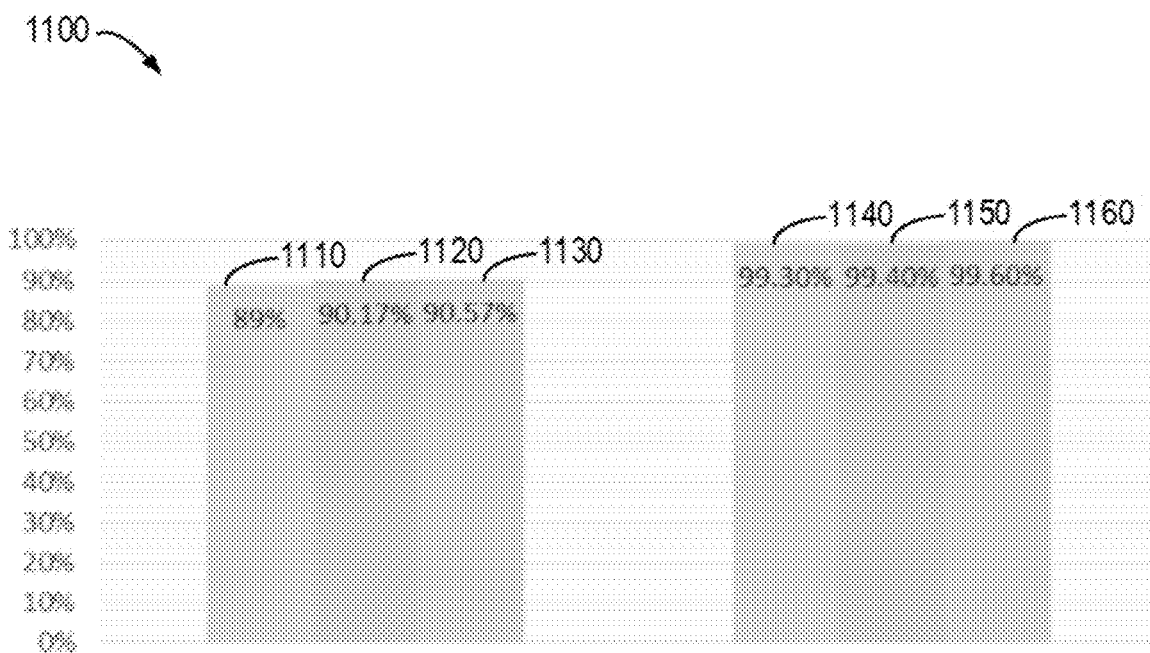
FIG. 11 illustrates a schematic diagram of a simulation test result according to an embodiment of the present disclosure.

FIG. 11 illustrates a schematic diagram of a simulation test result 1100 according to an embodiment of the present disclosure. In the test of FIG. 11, the detection correctness of the device recognition model 610 is tested under the influence of the number of training times and a symbol length (equivalent to the number of samples of the signal). In the specific simulation test, several (for example, 8, 32, 64) channels from the second device to the first device were generated using various channel bandwidths and optical fiber distances. The simulated second device is used to randomly send 01 bit string to the simulated first device. The input provided to the device recognition model 610 is 100 bars in the histogram of the signal samples received by the first device, and indicator bits output by the device recognition model 610 are the same as the number of second devices.

As shown in FIG. 11, the column 1110 represents the recognition accuracy of the device recognition model 610 after 20,000 times of training in the case of a symbol length of 100,000. The column 1120 represents the recognition accuracy of the device recognition model 610 after 50,000 times of training in the case of a symbol length of 100,000. The column 1130 indicates the recognition accuracy of the device recognition model 610 after 80,000 times of training in the case of a symbol length of 100,000.

In addition, the column 1140 represents the recognition accuracy of the device recognition model 610 after 20,000 times of training in the case of a symbol length of 100,000. The column 1150 represents the recognition accuracy of the device recognition model 610 after 50,000 times of training in the case of a symbol length of 100,000. The column 1160 represents the recognition accuracy of the device recognition model 610 after 80,000 times of training in the case of a symbol length of 100,000.

In addition, the columns 1110 to 1160 are all simulation results of detecting one or two second devices among the eight second devices. It may be seen from FIG. 11 that more times of training (for example, more than 20,000 times) and a longer symbol length (for example, more than 100,000) may help improve the detection precision of the device recognition model 610 (for example, up to 99% or higher). In addition, it should be noted that although the symbol length and the number of training times are large here, it means that the symbol length and the number of times of training herein are both larger, which means a large amount of training data is required, the large amount of training data may be obtained in a very short of time period due to a very fast rate of the 50G-PON.

Figure 12:
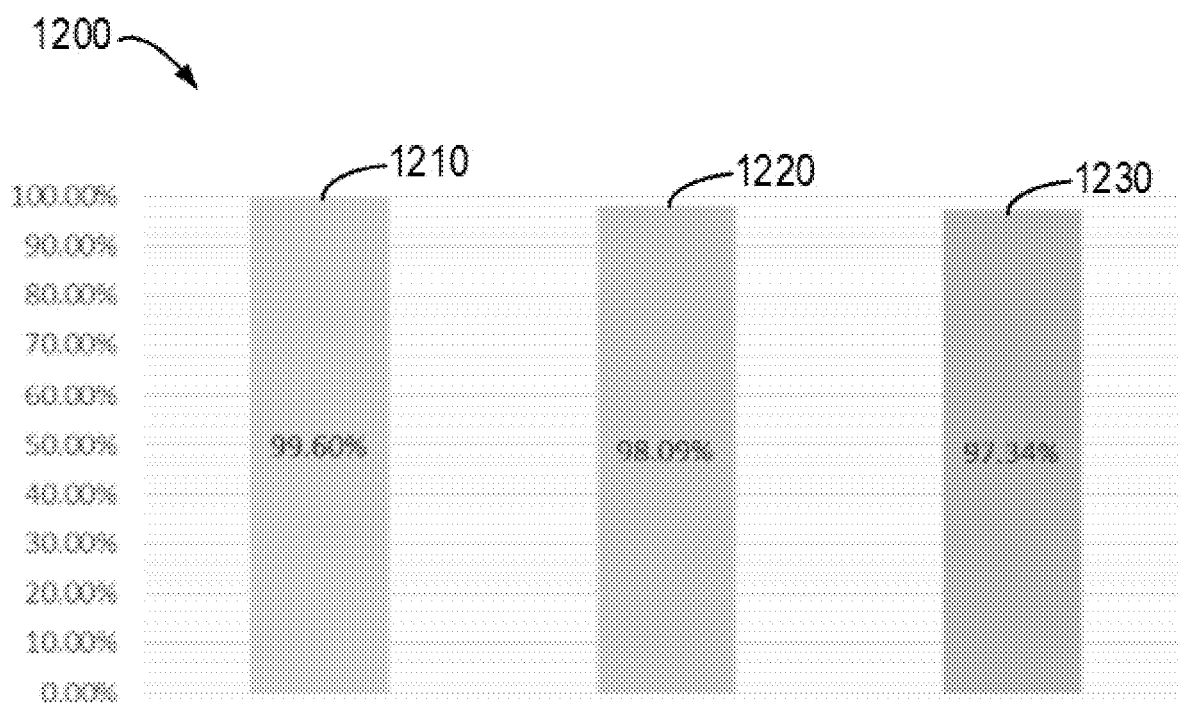
FIG. 12 illustrates a schematic diagram of another simulation test result according to an embodiment of the present disclosure.

FIG. 12 illustrates a schematic diagram of another simulation test result 1200 according to an embodiment of the present disclosure. In the test of FIG. 12, the detection correctness of the device recognition model 610 is tested under the influence of the number of second devices. As shown in FIG. 12, the column 1210 represents the recognition accuracy of the device recognition model 610 in a case where one or two second devices are detected among the eight second devices. The column 1220 represents the recognition accuracy of the device recognition model 610 in a case where one or two second devices are detected among 32 second devices. The column 1230 represents the recognition accuracy of the device recognition model 610 in a case where one or two second devices are detected among 64 second devices.

It may be seen from FIG. 12 that, consistent with the intuitive perception, the greater the number of second units, the more difficult it is for the device recognition model 610 to detect a signal sending device or a combination of sending devices. Therefore, in practice, a final test result might need to be based on a plurality of tests. For example, although the device recognition model 610 may have certain inaccuracy in a single recognition (for example, about 0.4%-2.66%), the inaccuracy of the device recognition model 610 would fall rapidly after two or more times of recognition, and the probability of erroneous detection would become very low.

As a possible application scenario, the embodiments of the present disclosure may be used in a passive optical network (for example, a 50G-PON). For the passive optical network, most traditional "timeslot error rogue optical network unit detection" methods are designed on a platform of the hardware and software capabilities of the previous generation of passive optical networks. Therefore, in the face of various rogue behaviors, these traditional methods are not satisfactory in terms of versatility, efficiency, accuracy and intelligence.

In the embodiments of the present disclosure, a 50G-PON-orientated "rogue optical network unit detection" apparatus and method may be provided. The apparatus and method make use of existing resources such as 50G-PON physical medium dependent ADC and DSP, and provide an instantaneous rogue-optical network unit detection capability, and meanwhile keep transparent for normal passive optical network service in a data collection phase and a detection and training phase without interrupting the service.

A basic mechanism of instantaneous detection of rogue optical network unit may be based on intelligently recognizing the identifier of the optical network unit from a signal amplitude distribution pattern (mode), which may be implemented based on machine learning technology of a neural network. Such "signal amplitude distribution pattern to optical network unit identifier" converter (i.e., device recognition model) may require raw signal data (e.g., specially organized symbols) as input for training, and during the training process, it may involve the use of specialized training data pairs to learn adaptive convertor for any given PON in practice.

Equipped with such an adaptively trained rogue-ONU detector function, PON may be maintained in normal operating manner and OLT can activate the detector at any time once there's a request for detecting a rogue ONU, and the detector may instantaneously indicate identifiers of the current two (or more) ONUs, one or more of which is (are) the rogue ONU(s).

In some embodiments, an apparatus capable of executing the method 200 (for example, the first device 110) may include means for executing corresponding steps of the method 200. The means may be implemented in any suitable form. For example, the means may be implemented in a circuit or in software modules. In another example, the means may include at least one processor and at least one memory. The at least one memory may store computer program code. The at least one memory and the computer program code are configured to, together with the at least one processor, cause the apparatus to perform corresponding steps.

In some embodiments, the apparatus includes: means for receiving, at a first device, a mixed signal including a target signal from a target device among a plurality of second devices and an interfering signal from the plurality of second devices; means for determining a distribution characteristic of an amplitude of the mixed signal within an amplitude variation range, the distribution characteristic being associated with the target device and an interfering device generating the interfering signal; and means for determining the interfering device from the plurality of second devices based on the distribution characteristic.

In some embodiments, the means for determining the distribution characteristic includes: means for dividing the amplitude variation range into a plurality of sections; and means for determining a distribution of the amplitude of the mixed signal within the plurality of sections.

In some embodiments, the means for determining the distribution includes: means for obtaining a plurality of samples of the mixed signal; means for determining a correspondence relationship between the amplitudes of the plurality of samples and the plurality of sections;

and means for determining the number of samples corresponding to each of the plurality of sections based on the correspondence relationship.

In some embodiments, the means for dividing the amplitude variation range into a plurality of sections includes: means for dividing the amplitude variation range into a predetermined number of sections of the same size.

In some embodiments, the means for determining the distribution characteristic includes: means for determining the distribution characteristic according to an instruction to detect the interfering device.

In some embodiments, the means for determining the interfering device includes: means for obtaining a device recognition model characterizing associations between distribution characteristics of signals and second devices; and means for determining the interfering device from the plurality of second devices by applying the distribution characteristic to the device recognition model.

In some embodiments, the means for obtaining the device recognition model includes: means for receiving a first signal and a second signal from a first test device and a second test device among the plurality of second devices, respectively; means for generating a simulated mixed signal by mixing the first signal with the second signal; means for determining a simulated distribution characteristic of an amplitude of the simulated mixed signal within the amplitude variation range; and means for training the device recognition model based on the simulated distribution characteristic, and identifiers of the first test device and the second test device.

In some embodiments, the means for receiving a first signal and a second signal includes: means for receiving the first signal and the second signal during normal operation of the first device and the plurality of second devices.

In some embodiments, the first device includes an optical line terminal, and the second device comprises an optical network unit.

Figure 13:
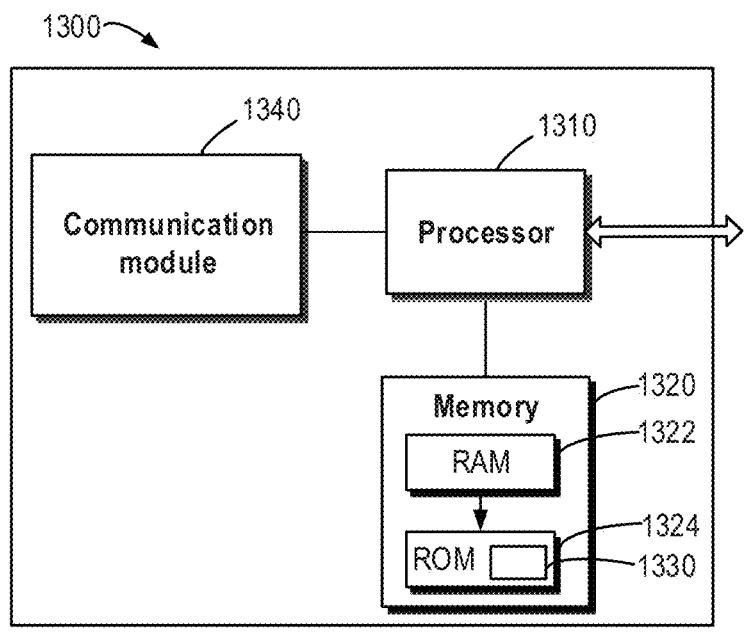
FIG. 13 illustrates a simplified block diagram of an example device suitable for implementing embodiments of the present disclosure.

FIG. 13 shows a simplified block diagram of an example device 1300 suitable for implementing embodiments of the present disclosure. The device 1300 may be used to implement a communication device, such as the first device 110 and the second device 120 in FIG. 1. As shown, the device 1300 includes one or more processors 1310, one or more memories 1320 coupled to the one or more processors 1310, and one or more communication modules 1340 coupled to the one or more processors 1310.

The communication module 1340 is used for bidirectional communication. The communication module 1340 has at least one cable/optical cable/wireless interface for facilitating communication. The communication interface may mean any interface necessary for communication with other devices.

The processor 1310 may be of any type suitable to the local technical environment and may include one or more of the following as non-limiting examples: general purpose computers, special purpose computers, microprocessors, digital signal processors (DSPs) and processors based on multicore processor architecture. The device 1300 may have multiple processors, such as an application specific integrated circuit chip that is slaved in time to a clock which synchronizes the main processor.

The memory 1320 may include one or more non-volatile memories and one or more volatile memories. Examples of the non-volatile memories include, but are not limited to, a Read Only Memory (ROM) 1324, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1322 and other volatile memories that would not last in the power-down duration.

A computer program 1330 includes computer executable instructions that are executed by the associated processor 1310. The program 1330 may be stored in the ROM 1324. The processor 1310 may perform any suitable actions and processing by loading the program 1330 into the RAM 1322.

The embodiments of the present disclosure may be implemented by means of the program 1330 so that the device 1300 may perform any processes of the disclosure as discussed with reference to FIG. 2, FIG. 3, FIG. 7 and FIG. 9. The embodiments of the present disclosure may also be implemented by hardwares or by a combination of softwares and hardwares.

In some embodiments, the program 1330 may be tangibly contained in a computer readable medium which may be included in the device 1300 (for example, in the memory 1320) or other storage devices that are accessible by the device 1300. The device 1300 may load the program 1330 from the computer readable medium to the RAM 1322 for execution. The computer readable medium may include any type of tangible non-volatile storage, such as ROM, EPROM, a flash memory, a hard disk, CD, DVD, and the like.

Figure 14:
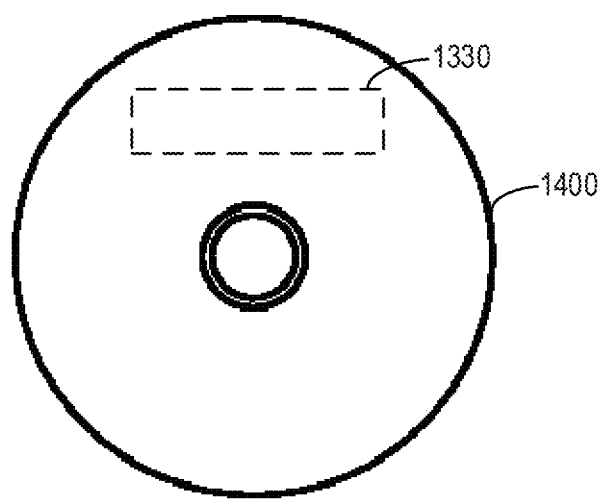
FIG. 14 illustrates a schematic diagram of an exemplary computer readable medium according to an embodiment of the present disclosure.

FIG. 14 illustrates a schematic diagram of an exemplary computer readable medium 1400 according to an embodiment of the present disclosure. As shown in FIG. 14, the computer-readable medium 1400 may be in the form of a CD or DVD or any other suitable forms with a program 1330 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. For example, in some embodiments, various examples (for example, methods, apparatuses, or devices) of the present disclosure may be partially or fully implemented on a computer-readable medium. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product stored on a non-transitory computer readable storage medium. The computer program product includes computer-executable instructions, such as those included in program modules, being executed in a device on a target real or virtual processor, to implement any process of processes 200, 300, 700 and 1000 as described above with reference to FIG. 2, FIG. 3, FIG. 7 and FIG. 10. Generally, program modules include routines, programs, libraries, objects, classes, components, data structures, and the like that perform particular tasks or implement particular abstract data structures. The functionality of the program modules may be combined or split between program modules as desired in various embodiments. Machine-executable instructions for program modules may be executed within a local or distributed device. In a distributed device, program modules may be located in both local and remote storage media.

Program code for implementing methods of the present disclosure may be written in one or more programming languages. These program codes may be provided to a processor or controller of a general purpose computer, special purpose computer, or other programmable data processing apparatus, such that the program codes, when executed by the processor or other programmable data processing apparatus, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but is not limited to an electronic, magnetic, optical, electromagnetic, infrared, or semiconductor system, apparatus, or device, or any suitable combinations thereof. More specific examples of the computer readable storage media would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof.

In addition, although the operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the foregoing discussions, these should not be construed as limitations on the scope of the present disclosure, but rather as descriptions of features that may be specific to particular embodiments. Certain features that are described in the context of separate embodiments may also be implemented in combinations in a single embodiment. Conversely, various features that are described in the context of a single embodiment may also be implemented in multiple embodiments separately or in any suitable sub-combinations.

Although the subject matter has been described in languages specific to structural features and/or methodological acts, it should be understood that the present disclosure defined in the appended claims is not limited to the specific features or acts described above. Rather, the specific features and actions described above are disclosed as example forms of implementing the claims.

We claim:

1. A method for communications, comprising:
   receiving, at a first device, a mixed signal comprising a target signal from a target device among a plurality of second devices and an interfering signal from the plurality of second devices;
   determining a distribution characteristic of an amplitude of the mixed signal within an amplitude variation range, the distribution characteristic being associated with the target device and an interfering device generating the interfering signal; and
   determining the interfering device from the plurality of second devices based on the distribution characteristic,
   wherein the first device comprises an optical line terminal, and the plurality of second devices comprises optical network units, and
   wherein the mixed signal is received from at least one of an optical line or optical cable.

2. The method of claim 1, wherein the determining the distribution characteristic comprises:
   dividing the amplitude variation range into a plurality of sections; and
   determining a distribution of the amplitude of the mixed signal within the plurality of sections.

3. The method of claim 2, wherein the determining the distribution of the amplitude comprises:
   obtaining a plurality of samples of the mixed signal;
   determining a correspondence relationship between amplitudes of the plurality of samples and the plurality of sections; and
   determining the number of samples corresponding to each of the plurality of sections based on the correspondence relationship.

4. The method of claim 2, wherein the dividing the amplitude variation range into the plurality of sections comprises:
   dividing the amplitude variation range into a number of sections of the same size.

5. The method of claim 1, wherein the determining the distribution characteristic comprises:
    determining the distribution characteristic according to an instruction to detect the interfering device.

6. The method of claim 1, wherein the determining the interfering device comprises:
    obtaining a device recognition model characterizing associations between distribution characteristics of signals and second devices; and
    determining the interfering device from the plurality of second devices by applying the distribution characteristic to the device recognition model.

7. The method of claim 6, wherein the obtaining the device recognition model comprises:
    receiving a first signal and a second signal from a first test device and a second test device among the plurality of second devices, respectively;
    generating a simulated mixed signal by mixing the first signal with the second signal;
    determining a simulated distribution characteristic of an amplitude of the simulated mixed signal within the amplitude variation range; and
    training the device recognition model based on the simulated distribution characteristic and identifiers of the first test device and the second test device.

8. The method of claim 7, wherein the receiving the first signal and the second signal comprises:
    receiving the first signal and the second signal during normal operations of the first device and the plurality of second devices.

9. A non-transitory computer readable medium having machine executable instructions stored thereon which, when executed by a processor of a machine, cause the machine to perform the method of claim 1.

10. A first device comprising:
    at least one processor; and
    at least one memory comprising computer program instructions, the at least one memory and the computer program instructions being configured to, with the at least one processor, cause the first device to:
    receive a mixed signal comprising a target signal from a target device among a plurality of second devices and an interfering signal from the plurality of second devices;
    determine a distribution characteristic of an amplitude of the mixed signal within an amplitude variation range, the distribution characteristic being associated with the target device and an interfering device generating the interfering signal; and
    determine the interfering device from the plurality of second devices based on the distribution characteristic,
    wherein the first device comprises an optical line terminal, and the plurality of second devices comprise optical network units, and
    wherein the mixed signal is received from at least one of an optical line or optical cable.

11. The first device of claim 10, wherein the first device is caused to determine the distribution characteristic by:
    dividing the amplitude variation range into a plurality of sections; and
    determining a distribution of the amplitude of the mixed signal within the plurality of sections.

12. The first device of claim 11, wherein the first device is caused to determine the distribution of the amplitude by:
    obtaining a plurality of samples of the mixed signal;
    determining a correspondence relationship between amplitudes of the plurality of samples and the plurality of sections; and
    determining the number of samples corresponding to each of the plurality of sections based on the correspondence relationship.

13. The first device of claim 11, wherein the first device is caused to divide the amplitude variation range into the plurality of sections by:
    dividing the amplitude variation range into a number of sections of the same size.

14. The first device of claim 10, wherein the first device is caused to determine the distribution characteristic by:
    determining the distribution characteristic according to an instruction to detect the interfering device.

15. The first device of claim 10, wherein the first device is caused to determine the interfering device by:
    obtaining a device recognition model characterizing associations between distribution characteristics of signals and second devices; and
    determining the interfering device from the plurality of second devices by applying the distribution characteristic to the device recognition model.

16. The first device of claim 15, wherein the first device is caused to obtain the device recognition model by:
    receiving a first signal and a second signal from a first test device and a second test device among the plurality of second devices, respectively;
    generating a simulated mixed signal by mixing the first signal with the second signal;
    determining a simulated distribution characteristic of an amplitude of the simulated mixed signal within the amplitude variation range; and
    training the device recognition model based on the simulated distribution characteristic and identifiers of the first test device and the second test device.

17. The first device of claim 16, wherein the first device is caused to receive the first signal and the second signal by:
    receiving the first signal and the second signal during normal operations of the first device and the plurality of second devices.

18. An apparatus for communications, comprising:
    means for receiving, at a first device, a mixed signal comprising a target signal from a target device among a plurality of second devices and an interfering signal from the plurality of second devices;
    means for determining a distribution characteristic of an amplitude of the mixed signal within an amplitude variation range, the distribution characteristic being associated with the target device and an interfering device generating the interfering signal; and
    means for determining the interfering device from the plurality of second devices based on the distribution characteristic,
    wherein the first device comprises an optical line terminal, and the plurality of second devices comprise optical network units, and
    wherein the mixed signal is received from at least one of an optical line or optical cable.

* * * * *